(No Model.)
M. V. PALMER.
PORTABLE LIFTING CLAMP.
No. 246,632. Patented Sept. 6, 1881.
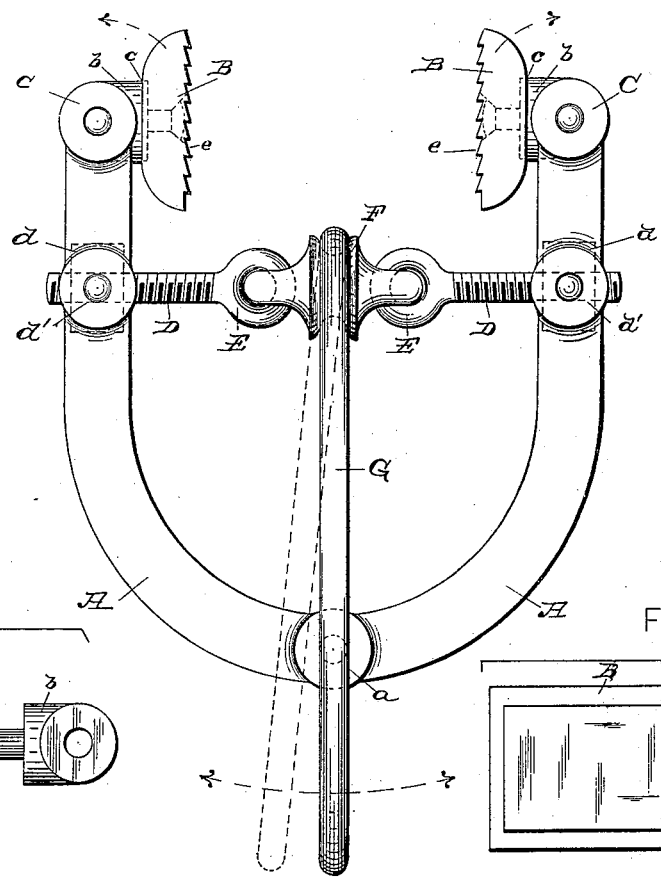
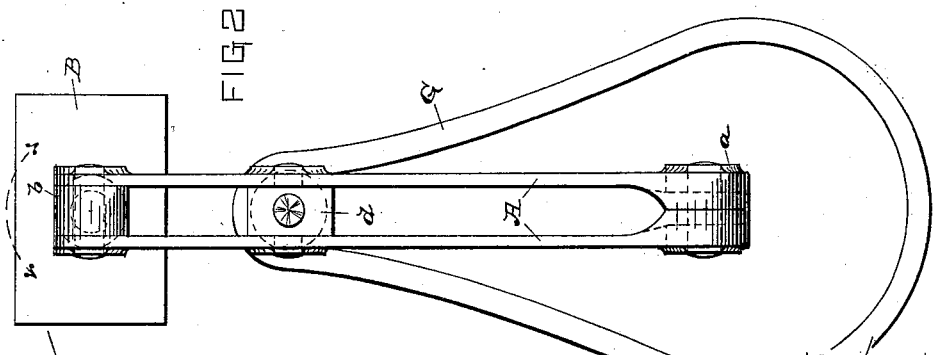

UNITED STATES PATENT OFFICE.

MARO V. PALMER, OF WINDSOR LOCKS, CONNECTICUT.

PORTABLE LIFTING-CLAMP.

SPECIFICATION forming part of Letters Patent No. 246,632, dated September 6, 1881.

Application filed July 30, 1881. (No model.)

*To all whom it may concern:*

Be it known that I, MARO V. PALMER, of Windsor Locks, in the county of Hartford and State of Connecticut, have invented a new and useful Improvement in Portable Lifting-Clamps, which improvement is fully set forth in the annexed specification and accompanying drawings, in which—

Figure 1 is a plan view of my improved clamp; Fig. 2, a side elevation; Fig. 3, a detail view of the clamping-block; Fig. 4, a plan and sectional elevation of the clamping-block provided with a wood or rubber block to prevent any injurious effects of the clamp.

The object of my device is to provide a simple and effective clamp, which is easily adjusted to the thickness of material desired to be clamped; second, to allow of a universal movement of the clamp and its parts from the point of attachment in conjunction with the weight attached; third, an increased clamping effect, obtained through the system of leverage.

Similar letters refer to similar parts throughout the several views.

In the drawings, A A represent curved arms or levers, which are hinged at one end, as shown at $a$. At the opposite end they are connected together by a pin passing through a block, $b$, which is adapted to move on said pin through the arc, as shown by dotted lines, Fig. 1. On block $b$ is formed or otherwise attached a pin or stud, $b'$, which passes through a block or clamping-pad, B, and is riveted, but not so tight as to prevent the clamping-pad from turning on said pin on an arc, as shown by dotted lines in Fig. 2. The inner surface of the clamping-pad is serrated to give a firmer hold upon the object grasped.

Instead of serrations $e$, there may be let into the clamping-pad B a block provided with a serrated surface, (not shown,) or a block of wood, rubber, or other analogous substance, the same to be used where the object to be grasped is likely to be injured. (See Fig. 4.)

$d\ d$ are nuts swiveled upon studs or pins $d'$ $d'$, between the arms A A, and tapped right and left handed.

D D are right and left handed bolts or screws, which pass through the nut, with a corresponding thread, respectively. Each screw is provided with an opening or eye, E, and are connected together by a link provided with an annular groove, F, at the center of said link.

In the annular groove F is placed a link or loop, G, of pear shape. The smaller end of said link plays over the link connecting the two bolts, and the larger end of link G extends around and outside of the arms A A, as shown in Fig. 2. By this arrangement any tackle attached to the loop can be drawn to one side in a plane at right angles to the object to which the clamping-blocks are attached; or it can be drawn in a plane corresponding to that of the object to which it is attached, when it will be free to move, through the means of the joints at $c$.

The operation of the clamp is as follows: Suppose, for instance, it is desired to lift a heavy weight in a shop out of reach of a crane, and where there are timbers or joist overhead, the clamp is first taken and the jaws adjusted by turning one of the screws D. By the turning of one screw both jaws are adjusted to the thickness of the timber, and until it is able to sustain its own weight. Then a tackle is attached to the link or loop G, and the weight which is desired to be moved is started. This increased resistance pulls on the link connecting the screws D, and through them on the arms or levers A A and clamping-blocks B B, which grasp the timber tighter and tighter the more the resistance is increased. Should the weight to be moved happen to be at a point distant from a line dropped perpendicular from the point of suspension of the clamp, the same will adjust itself automatically through the means of the joints described to a line drawn direct from the point of suspension to the object desired to be lifted.

Having thus described my invention, what I claim as new, and desire to secure by Letters Patent, is—

1. A portable lifting-clamp adapted to be adjusted through the means of screws passing through swiveled nuts attached to arms or levers of said clamp, as and for the purpose set forth.

2. A portable lifting-clamp provided with a series of joints which adapt it to adjust itself to any angle from the point of suspension, as and for the purpose set forth.

3. A portable lifting-clamp provided with hinged arms or levers, combined with right and left handed adjusting-screws and connecting-links, which receive the resistance of the weight to tighten the clamp, as and for the purpose set forth.

4. A portable lifting-clamp provided with arms or levers A A, clamping-blocks B B, blocks $b\ b$, and joint $c$, so combined that the arms A A move in the same plane with the object to which the clamp is attached, as and for the purpose set forth.

5. A portable lifting-clamp provided with arms A A, hinged at $a$, clamping-blocks B B, blocks $b\ b$, and swiveled nuts $d\ d$, combined with screws D D, link F, and loop G, as and for the purpose set forth.

MARO V. PALMER.

Witnesses:
MICHAEL I. BYRNE,
CHRISTOPHER KELLY.